(12) United States Patent
Uchida (10) Patent No.: US 8,594,871 B2
(45) Date of Patent: Nov. 26, 2013

(54) VEHICLE BATTERY DIAGNOSIS SYSTEM, AND VEHICLE

(75) Inventor: Masatoshi Uchida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 243 days.

(21) Appl. No.: 13/125,882

(22) PCT Filed: Oct. 22, 2009

(86) PCT No.: PCT/IB2009/007181
§ 371 (c)(1),
(2), (4) Date: Apr. 25, 2011

(87) PCT Pub. No.: WO2010/055378
PCT Pub. Date: May 20, 2010

(65) Prior Publication Data
US 2011/0208382 A1    Aug. 25, 2011

(30) Foreign Application Priority Data
Nov. 13, 2008 (JP) .................................. 2008-290972

(51) Int. Cl.
*B60L 9/00* (2006.01)
*G01M 17/00* (2006.01)
*B60K 1/00* (2006.01)
*B60Q 1/00* (2006.01)

(52) U.S. Cl.
USPC ............. 701/22; 701/29.1; 701/66; 180/65.1; 180/65.31; 180/65.51; 180/65.6; 903/902; 903/903; 903/947; 903/930; 903/951; 340/439; 320/104; 320/124; 320/134; 320/136

(58) Field of Classification Search
USPC ................. 701/22, 29.1, 66; 180/65.1–65.31, 180/65.51, 65.6; 903/902, 903, 947, 930, 903/951; 340/439; 320/104–124, 134–136
See application file for complete search history.

(56) References Cited

U.S. PATENT DOCUMENTS

2002/0188387 A1* 12/2002 Woestman et al. ............. 701/22
2006/0278449 A1* 12/2006 Torre-Bueno ................ 180/65.2

(Continued)

FOREIGN PATENT DOCUMENTS

GB    2 448 972 A    11/2008
JP    A-07-073906    3/1995

(Continued)

OTHER PUBLICATIONS

Jul. 3, 2012 Office Action issued with Japanese Patent Application No. 2008-290972 (with partial translation).

(Continued)

*Primary Examiner* — James Trammell
*Assistant Examiner* — Majdi Alsomiri
(74) *Attorney, Agent, or Firm* — Oliff & Berridge, PLC (57) ABSTRACT

A vehicle battery diagnosis system diagnoses the state of use of a battery of a vehicle, and includes: an information accumulation portion that accumulates diagnostic information that includes a use condition regarding the battery; a control plan presentation portion that presents a plurality of control plans about the vehicle for increasing the service life of the battery on the basis of the diagnostic information; and an information changing portion that changes control information regarding the control of the vehicle which is retained in a vehicle-mounted ECU of the vehicle so that the control information corresponds to a control plan selected from the plurality of control plans.

6 Claims, 8 Drawing Sheets

(56) References Cited

U.S. PATENT DOCUMENTS

| | | | |
|---|---|---|---|
| 2007/0208467 A1* | 9/2007 | Maguire et al. | 701/22 |
| 2008/0275644 A1* | 11/2008 | Macneille et al. | 701/209 |
| 2009/0040033 A1 | 2/2009 | Uchida | |
| 2009/0326749 A1 | 12/2009 | Uchida | |
| 2010/0033132 A1* | 2/2010 | Nishi et al. | 320/136 |
| 2010/0217467 A1* | 8/2010 | de la Torre Bueno | 701/22 |

FOREIGN PATENT DOCUMENTS

| | | |
|---|---|---|
| JP | A-2004-072927 | 3/2004 |
| JP | A-2005-227141 | 8/2005 |
| JP | A-2007-049771 | 2/2007 |
| JP | A-2007-55436 | 3/2007 |
| JP | A-2007-113524 | 5/2007 |
| JP | A-2007-210487 | 8/2007 |
| JP | A-2007-274806 | 10/2007 |
| JP | A-2008-024124 | 2/2008 |
| JP | A-2008-083022 | 4/2008 |
| WO | WO 2007/114410 A1 | 10/2007 |

OTHER PUBLICATIONS

International Search Report issued in International Application No. PCT/IB2009/007181 on Jun. 30, 2010.

Written Opinion of the International Searching Authority Report issued in International Application No. PCT/IB2009/007181 on Jun. 30, 2010.

International Preliminary Report on Patentability issued in International Application No. PCT/IB2009/007181 on Feb. 3, 2011.

* cited by examiner

SCREEN FOR USER

| | YOUR WAY OF USE | RECOMMENDED WAYS OF USE |
|---|---|---|
| 1. BRAKING | RELATIVELY SHARP | ▶ SLOWLY AND LONGISHLY<br>QUITE SLOWLY |
| 2. STANDSTILL START | RELATIVELY SHARP | ▶ SLOWLY AND LONGISHLY<br>QUITE SLOWLY |
| 3. CABIN TEMPERATURE SETTING | RELATIVELY HIGH | ▶ TO SLIGHTLY LOWER<br>TO QUITE LOWER |
| 4. CHARGING METHOD | FULLY CHARGED DAILY | ▶ FULLY CHARGED ONCE A WEEK, DAILY SOC 70%<br>FULLY CHARGED ONCE A MONTH, DAILY SOC 70% |
| 5. LONG-PERIOD PARKING | PARKING FOR 6 MONTHS OR LONGER IN PAST | ▶ RELATIVELY REDUCE LONG-PERIOD PARKING<br>QUITE REDUCE LONG-PERIOD PARKING |
| 6. OTHER (ADDITIONAL REGISTERED ITEM) | | |

FIG. 6

SCREEN FOR DEALER

| | PRESENT WAY OF USE | RECOMMENDED WAYS OF USE |
|---|---|---|
| 1. BRAKING CONDITION | 60 km/h→0 km/h IN 3 SEC<br>100 km/h→0 km/h IN 5 SEC | ▶ 60→0 km/h IN 5 SEC, 100→0 km/h IN 7 SEC<br>60→0 km/h IN 6 SEC, 100→0 km/h IN 8 SEC |
| 2. STANDSTILL START CONDITION | 0 km/h→60 km/h IN 4 SEC<br>0 km/h→100 km/h IN 5 SEC | ▶ 0→60 IN 6 SEC, 0→100 IN 5 SEC<br>0→60 IN 7 SEC, 0→100 IN 10 SEC |
| 3. BATTERY PACK TEMPERATURE CONDITION | AT CONSTANT SPEED OF 60 km/h, 35°C<br>AT CONSTANT SPEED OF 100 km/h, 40°C | ▶ 60km 33°C, 100km 38°C<br>60km 30°C, 100km 35°C |
| 4. CHARGING CONDITION | DAILY SOC100% | ▶ SOC100% 1WEEK, DAILY SOC70%<br>SOC100% 1MONTH, DAILY SOC70% |
| 5. PARKING CONDITION | PARKED FOR 1 YEAR OR LONGER ONCE<br>PARKED FOR HALF TO 1 YEAR TWICE | ▶ NO PARKING FOR 1 YEAR OR LONGER, PARKING FOR HALF TO 1 YEAR TWICE<br>NO PARKING FOR 1 YEAR OR LONGER, PARKING FOR HALF TO 1 YEAR ONCE |
| 6. OTHER (ADDITIONAL REGISTERED ITEM) | | |

FIG. 7

SCREEN FOR MANUFACTURER

| | PRESENT SETTING | SETTING OF RECOMMENDATION |
|---|---|---|
| 1. REGENERATIVE DECELERATING PARAMETER | Win=AkW | Win=BkW |
| 2. ACCELERATION PARAMETER | Wout=CkW | Wout=DkW |
| 3. IN-BATTERY PACK TEMPERATURE PARAMETER | CONTROL TEMPERATURE A1 A2 A3 | CONTROL TEMPERATURE B1 B2 B3 |
| 4. CHARGING PARAMETER | VALUE OF CURRENT C SOC D | VALUE OF CURRENT C1 SOC D1 |
| 5. PARKING CONDITION | LONG PERIOD E INTERMEDIATE PERIOD F | LONG PERIOD E1 INTERMEDIATE PERIOD F1 |
| 6. OTHER (ADDITIONAL REGISTERED ITEM) | | |

FIG. 8

VEHICLE BATTERY DIAGNOSIS SYSTEM, AND VEHICLE

FIELD OF THE INVENTION

The invention relates to a vehicle battery diagnosis system, and a vehicle. More particularly, the invention relates to a vehicle battery diagnosis system that diagnoses the state of use of a rechargeable battery of a vehicle equipped with the battery as a motive power source, and a vehicle.

BACKGROUND OF THE INVENTION

Japanese Patent Application Publication No. 2005-227141 (JP-A-2005-227141) relates to a vehicle diagnosis system that diagnoses degradation of a consumable item of a vehicle, and displays results of the diagnosis in a vehicle-mounted display screen. This system factors in information about a driver's driving behavior, and displays the degree of degradation of the consumable item and the driving behavior in an associated fashion.

In recent years, taking into consideration environmental issues such as global warming and the like, the development of vehicles equipped with a battery as a motive power source, such as electric motor vehicles, hybrid motor vehicles, etc., is being vigorously pursued.

Such a vehicle is equipped with a battery as a motive power source of an electric motor that drives the vehicle. Generally, such a battery is a secondary battery capable of being charged and discharged. In the case of an electric motor vehicle, the battery is charged by using a charging cable. In the case of a hybrid motor vehicle, the engine turns a vehicle-mounted generator to generate electric power, and the thus-generated electric power is used to charge the battery. In both the electric motor vehicle and the hybrid motor vehicle, when the vehicle is decelerated, regenerative braking is performed in a driving motor, and electric power generated at the time of regenerative braking is also charged into the battery.

Thus, the battery mounted in a vehicle as a motive power source degrades with the time of use, and therefore has a certain length of service life. As the battery is used for long time, the internal resistance of the battery rises, and the charging-discharging capability of the cell (battery capacity) gradually decreases. This time-dependent degradation of the battery varies depending on the driving pattern of the driver, the environment of the vehicle in which the battery is mounted.

Therefore, there is a possibility that the service life of the battery can be prolonged by optimizing the control regarding the charging and discharging of the battery, separately for each vehicle.

The battery, too, is a consumable item, and it is conceivable to apply thereto the foregoing vehicle diagnosis system disclosed in Japanese Patent Application Publication No. 2005-227141 (JP-A-2005-227141). However, in the foregoing system, it is not easy to understand what a user need to do after a vehicle diagnosis, and what betterment measures are available. It is desirable to present users what measures for increasing the battery's service life are available.

SUMMARY OF THE INVENTION

This invention provides a vehicle battery diagnosis system that is able to present control plans for increasing the service life of the battery mounted in a vehicle, and to change the control information regarding the control of the vehicle. The invention also provides a vehicle that is constructed so that the control information can be changed by the vehicle battery diagnosis system.

A first aspect of the invention relates to a vehicle battery diagnosis system. This vehicle battery diagnosis system diagnoses state of use of a rechargeable battery of a vehicle equipped with the battery as a motive power source. The vehicle battery diagnosis system includes: an information accumulation portion that accumulates diagnostic information that includes a use condition regarding the battery; a control plan presentation portion that presents a plurality of control plans about the vehicle for increasing service life of the battery based on the diagnostic information; and an information changing portion that changes control information regarding a control of the vehicle which is retained in the vehicle so that the control information corresponds to a control plan selected from the plurality of control plans.

The vehicle may include a rotary electric machine that drives a wheel. The rotary electric machine may generate regenerative electric power when braking the vehicle. The control information may include a control parameter that is changeable, and that defines an upper limit of electric power that is acceptable by the battery.

The vehicle may include a rotary electric machine that drives a wheel. The control information may include a control parameter that is changeable, and that defines an upper limit of electric power that is outputable from the battery.

Preferably, the vehicle includes a temperature adjustment device that uses electric power from the battery, and that adjusts temperature of a housing space of the battery. The control information includes a control parameter that is changeable, and that defines a target value for the temperature adjustment device.

The vehicle may include an internal combustion engine, a generator that generates electric power when receiving motive power from the internal combustion engine, and a control portion that performs a control of charging the battery with electric power generated by the generator. The control information may include a control parameter that is changeable, and that defines a target value of state of charge of the battery.

The control plan presentation portion may change a control plan that is presented according to an attribute of an operator of the vehicle battery diagnosis system.

The control plan presentation portion may have as the attribute of the operating person a user, a dealer, and a manufacturer.

The vehicle may have as the control information at least one of acceleration of the vehicle, temperature of the battery, state of charge of the battery, and duration of stop of the vehicle.

There may also be provided a vehicle that is connectable to any one of the foregoing constructions of the vehicle battery diagnosis system, and that includes an information storage portion that is able to change control information regarding a control of the vehicle.

A second aspect of the invention relates to a method of diagnosing state of use of a battery of a vehicle. This method is a method of diagnosing state of use of a rechargeable battery of a vehicle equipped with the battery as a motive power source. This method includes: detecting diagnostic information that includes a use condition regarding the battery; presenting a plurality of control plans about the vehicle for increasing service life of the battery based on the diagnostic information detected; selecting one of the plurality of control plans; and changing control information regarding a control of the vehicle which is retained in the vehicle so that the control information corresponds to the control plan selected.

According to the invention, service life-increasing plans are presented in such a manner that the user can easily understand what plans are available to increase the service life, and the performance of the vehicle can be changed in accordance with the selected service life-increasing plan.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Figure 1:
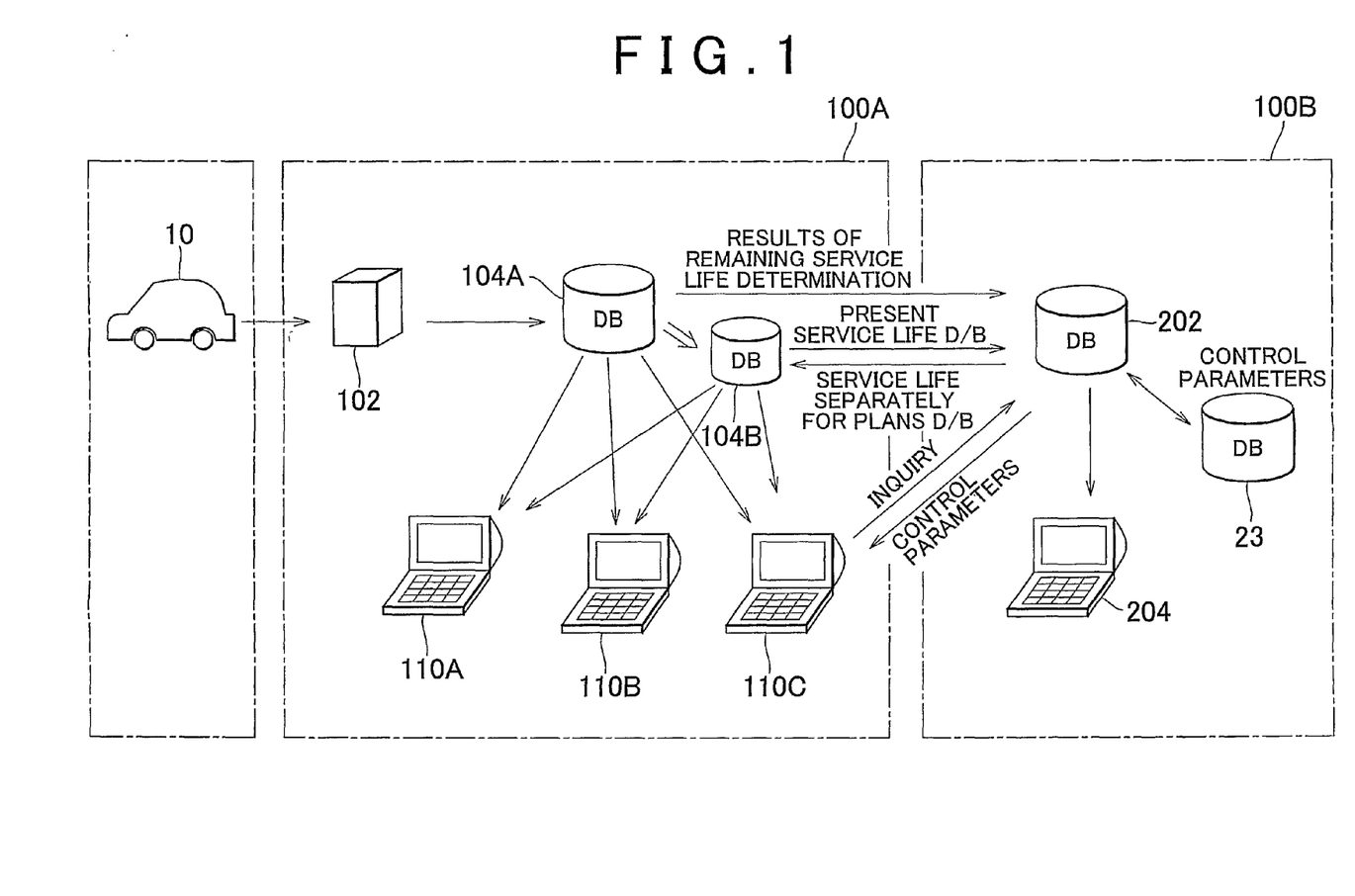
FIG. 1 is a block diagram showing a general construction of a vehicle battery diagnosis system of an embodiment of the invention.

FIG. 1 is a block diagram showing a general construction of a vehicle battery diagnosis system of an embodiment of the invention. Referring to FIG. 1, a user who uses the vehicle 10 takes the vehicle to a maintenance-repair shop, such as a car dealer or the like, or the like. Then, the vehicle 10 is connected to a battery diagnosis portion 102. The battery diagnosis portion 102 measures the state of a battery of the vehicle 10, or reads results of measurements that an ECU of the vehicle has carried out, and then performs diagnosis, and stores results of the diagnosis in a diagnostic result database 104A.

The user operates a terminal 110A to read diagnostic results from the database 104A, and causes the results to be displayed on a monitor screen of the terminal 110A. The maintenance-repair shop, such as a car dealer or the like, operates a terminal 110B so as to call up information that includes results of determination of an abnormal cell or module and also characteristics thereof, from the database 104A, and to display the information on a monitor screen of the terminal 110B. Besides, the maintenance-repair shop, such as a car dealer or the like, operates another terminal 110C so as to calculate the remaining service life of the battery as a whole at the time of the replacement of one or more of the modules of the battery on the basis of the diagnostic results stored in the database 104A, and so as to access a database 104B and display the result of determination about the remaining service life on a screen of the terminal 110C. The diagnostic results are also transferred to a database 202 of the battery manufacturer, so that engineers at the manufacturer can examine the content of the results by operating the terminal 204.

At the manufacturer, control parameters for prolonging the remaining service life of the battery module with advanced degradation are managed in a database 23. Management data is input from a terminal 204, and is stored in the database 202. A maintenance-repair shop, such as a dealer or the like, inquires of the manufacturer's database 202 from the terminal 110C about the control parameters for prolonging the remaining service life of the present battery module. Information that includes the control parameters that correspond to the inquiry from the terminal 110C is selected from the database 23, and is transmitted to the dealer's terminal 110C. The maintenance-repair shop, such as a dealer or the like, writes the received control parameters from the terminal 110C into a memory card or the like, and substitutes the control parameters written in the memory card or the like for the control parameters that are presently stored in the vehicle 10. Then, the remaining service life of the battery module can be prolonged; for example, the user can do without replacing the battery until the next official vehicle inspection.

Figure 2:
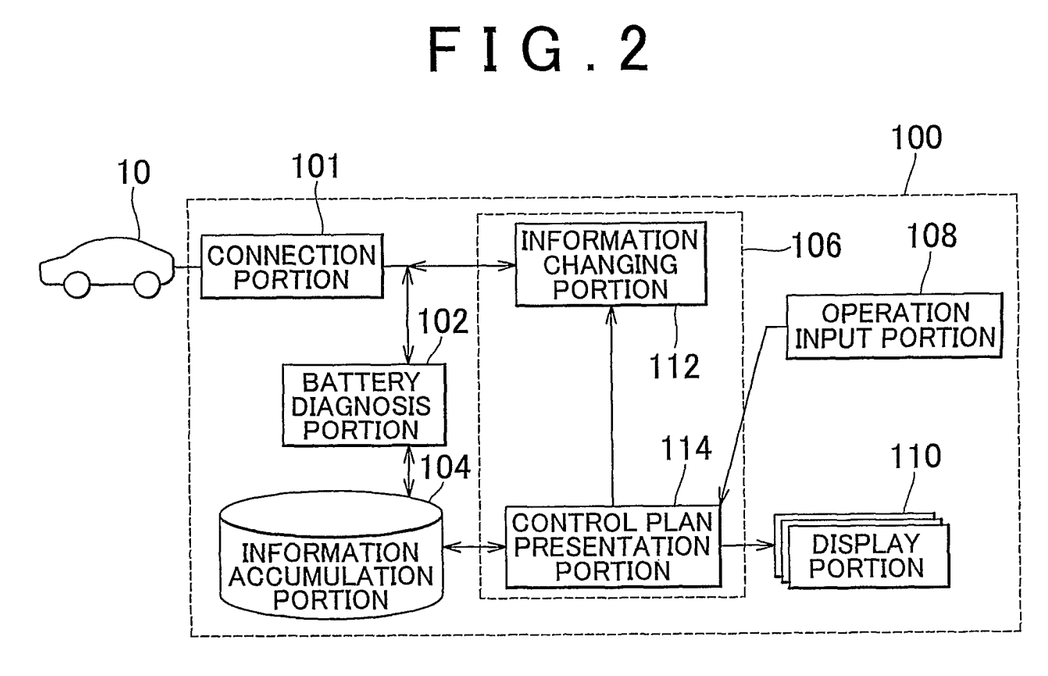
FIG. 2 is a block diagram showing a construction of the vehicle battery diagnosis system of the embodiment.

FIG. 2 is a block diagram showing a construction of a vehicle battery diagnosis system 100 of the embodiment.

Referring to FIG. 2, the vehicle battery diagnosis system 100 is connected to the user's vehicle 10 to perform a diagnosis of the battery mounted in the vehicle, and present control plans for increasing the service life of the battery, and is able to change the control information of the vehicle.

The vehicle battery diagnosis system 100 includes a connection portion 101, a battery diagnosis portion 102, and an information accumulation portion 104. The connection portion 101 is a site for connecting to the vehicle 10. The battery diagnosis portion 102 is electrically connected to the battery of the vehicle 10 via the connection portion 101 to perform diagnosis of the battery. The information accumulation portion 104 accumulates diagnostic information regarding the battery that the battery diagnosis portion 102 has diagnosed. As the information accumulation portion 104, it is possible to use, for example, a hard disk drive device, a non-volatile memory, etc.

The vehicle battery diagnosis system 100 further includes a control plan presentation portion 114, a display portion 110, an operation input portion 108, and an information changing portion 112. The control plan presentation portion 114 presents a plurality of plans for increasing the service life of the battery for the vehicle on the basis of the diagnostic information accumulated in the information accumulation portion 104. The display portion 110 displays to the user the plurality of control plans presented by the control plan presentation portion 114. The operation input portion 108 operates in conjunction with which one of the control plans displayed the user selects. The information changing portion 112 changes the control information regarding the control of the vehicle that is retained in the vehicle so that the control information corresponds to the control plan selected by the user from the plurality of plans.

The information changing portion 112 and the control plan presentation portion 114 can be realized by a single control device 106 such as a computer. The display portion 110 and the operation input portion 108 can be realized by a liquid crystal display equipped with a touch panel.

Besides, the battery diagnosis portion 102 and the control device 106 may be separable from each other so that they can be separately connected to the information accumulation portion 104.

Figure 3:
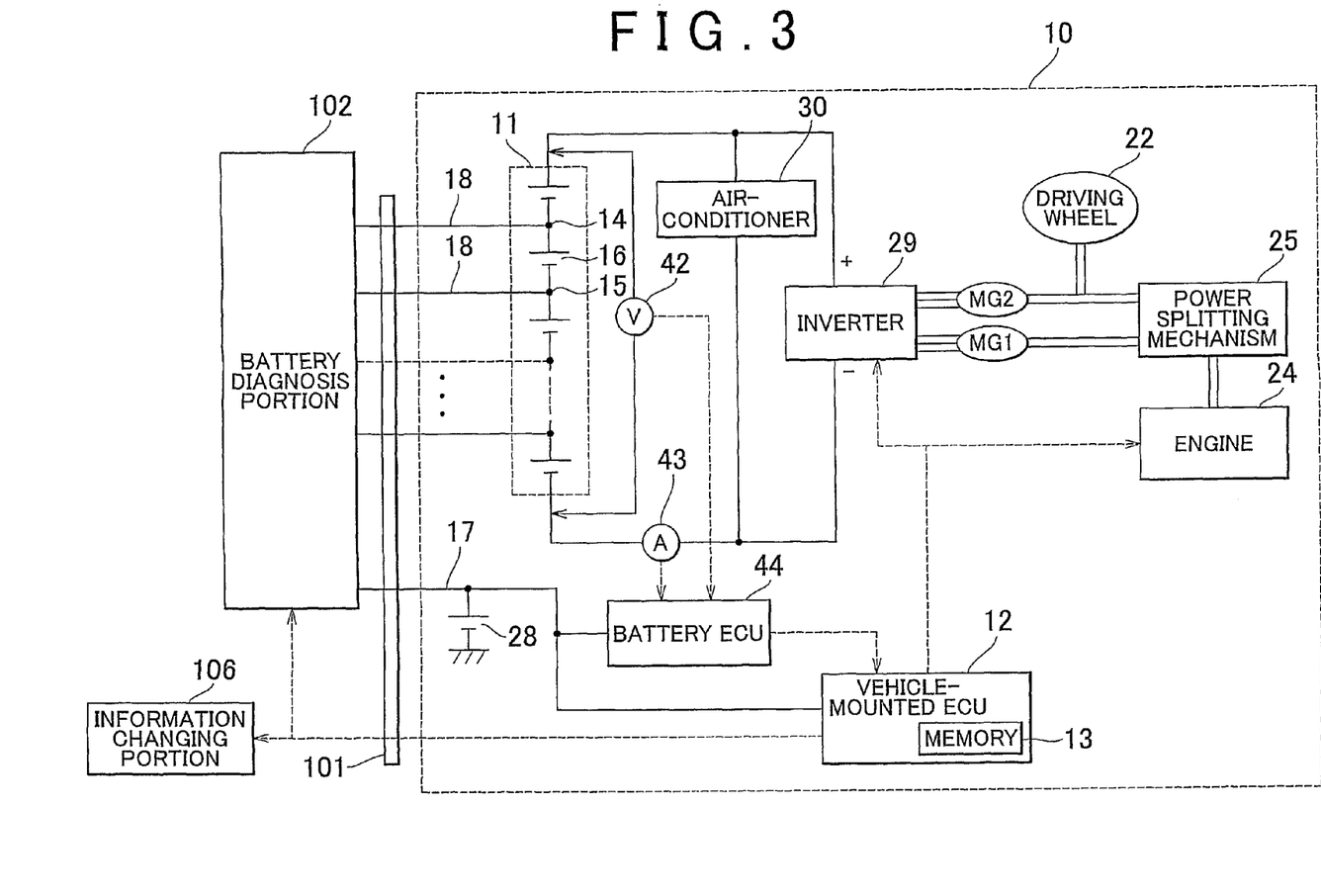
FIG. 3 is a circuit diagram showing the construction of the vehicle shown in FIG. 2.

FIG. 3 is a circuit diagram showing the construction of the vehicle 10 shown in FIG. 2. Referring to FIG. 3, the vehicle 10 is connectable to the battery diagnosis portion 102 and the information changing portion 112 via the connection portion 101 of the vehicle battery diagnosis system 100.

The vehicle 10 includes a driving wheel 22, motor-generators MG1 and MG2, a power splitting mechanism 25, an engine 24, an inverter 29, and a battery 11. The battery 11 supplies electric power to the inverter 29, which drives and controls the motor-generators MG1 and MG2.

The vehicle 10 further includes a voltage sensor 42, a current sensor 43, a battery ECU 44, a vehicle-mounted ECU 12, and an accessory power source 28.

Incidentally, the voltage value of the battery 11 is measured by the voltage sensor 42, and the current value is measured by the current sensor 43, and the current value and the voltage value are sent to the battery ECU 44. The battery ECU calculates a state of charge (SOC) of the battery 11 on the basis of the current value and the voltage value.

The battery diagnosis portion 102 is connected to the vehicle 10 to perform a diagnosis on the vehicle 10. Firstly, the accessory power source 28 within the vehicle 10 is connected to the battery diagnosis portion 102 by a power cable 17. Because of this connection, a rated current is given to the battery diagnosis portion 102 from the accessory power source 28. That is, the battery diagnosis portion 102 does not need to have an electric power source therein, but can be provided as a device with a simple construction.

The battery diagnosis portion 102 is connected to the positive terminal 14 and the negative terminal 15 of each module 16 of the battery 11, via a test cable 18. Because of this connection, the voltage value of each module 16 of the battery 11 is measured. However, since the supply of power from the accessory power source 28 lowers the fuel economy of the vehicle 10, a separate external power source (not shown) may be used.

Although an example in which the vehicle 10 is a hybrid motor vehicle is illustrated in the drawings, the vehicle may also be an electric motor vehicle in the invention. Besides, the vehicle 10 may also be a hybrid vehicle capable of the plug-in charging which is constructed so that the battery 11 can be charged from an external device.

The power splitting mechanism 25 is connected to rotation shafts of the engine 24 and the motor-generators MG1 and MG2. When the rotation speeds of two of the three rotation shafts are determined, the rotation speed of the other one rotation shaft is forced to be set. For example, the power splitting mechanism 25 is preferably a planetary gear (planetary gear mechanism) that have three input shafts. The rotation shaft of the motor-generator MG2 is connected to the driving wheel 22 by a speed reduction gear or the like, and operates mainly as a motor that drive the driving wheel 22. Besides, when braking force is caused on the driving wheel 22, the motor-generator MG2 generates regenerative electric power.

The motor-generator MG1 operates mainly as an electric generator that performs electric power generation using motive power from the engine. The electric power generated by the motor-generator MG1 is supplied to the motor-generator MG2, or charged into the battery 11, via the inverter 29.

A vehicle-mounted ECU 12 controls the inverter 29 and the engine 24. Within the vehicle-mounted ECU 12, control parameters are stored in a memory 13 or the like, and the parameters can be rewritten by the information changing portion 112.

Figure 4:
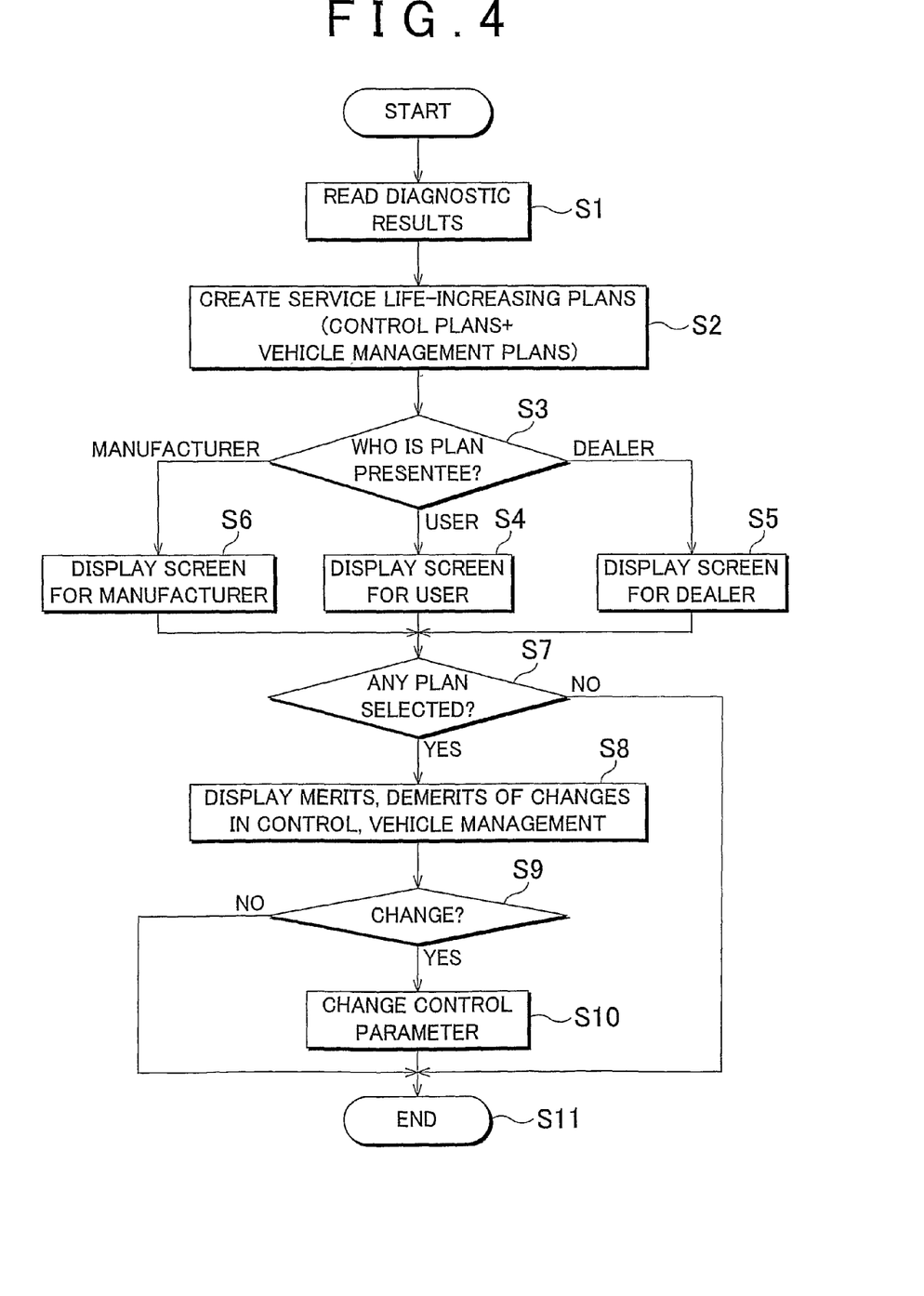
FIG. 4 is a flowchart for describing a control that is executed by the vehicle battery diagnosis system shown in FIG. 2.

FIG. 4 is a flowchart for describing a control that is executed by the vehicle battery diagnosis system 100 shown in FIG. 2.

Referring to FIGS. 2 and 4, firstly in step S1, diagnostic results accumulated in the information accumulation portion 104 are read to the control plan presentation portion 114. The diagnostic results include information that shows how the battery has been used. Therefore, the vehicle-mounted ECU 12 in FIG. 3 stores the history of use of the battery by the user in a tallied-up form. This history of use is read as diagnostic results by the battery diagnosis portion 102.

Subsequently, in step S2, the control plan presentation portion 114 creates service life-increasing plans (that include a plurality of control plans and vehicle management plans) for increasing the service life of the battery, on the basis of the diagnostic results.

Subsequently in step S3, it is determined which one of the user, the dealer and the manufacturer the plans are to be presented to (i.e., who is the plan presentee). As for this determination, each vehicle battery diagnosis system may be registered beforehand in the appliance for a user or for a dealer. Or this determination may be carried out through by making an inquiry in the display portion 110.

If in step S3 it is determined that the plan presentee is a user, the process proceeds to step S4, in which a screen designed for users is displayed.

Figure 5:
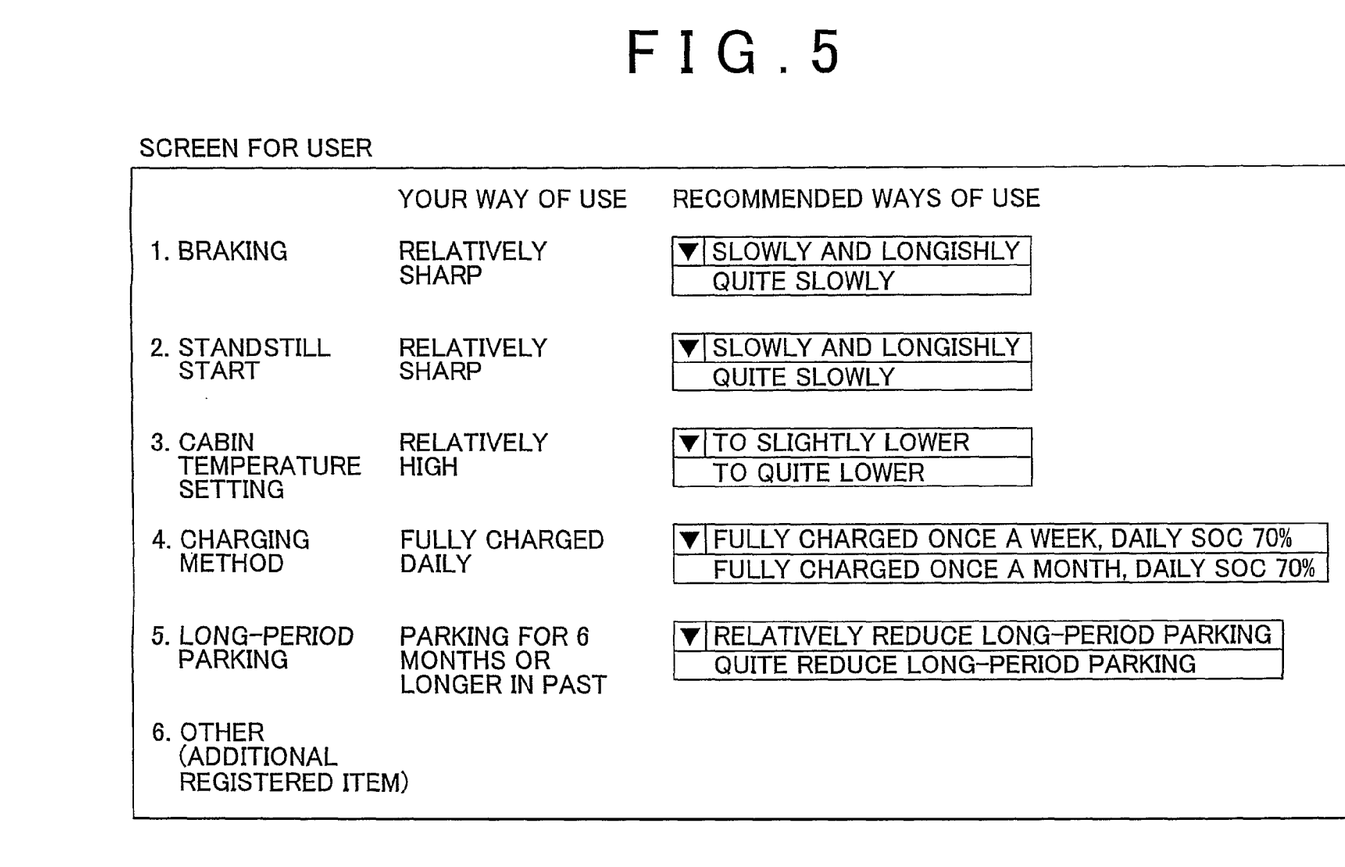
FIG. 5 is a diagram showing an example of the display of a screen designed for a user which is displayed in step S4 in FIG. 4.

FIG. 5 is a diagram showing an example of the display in the screen for users which is displayed in step S4 in FIG. 4. Referring to FIG. 5, five items are displayed as diagnostic results regarding the use of the battery, that is, "BRAKING", "STANDSTILL START", "CABIN TEMPERATURE SETTING", "METHOD OF CHARGING", and "LONG-PERIOD PARKING". Regarding the item 1. "BRAKING", the user's way of use is displayed as being "RELATIVELY SHARP" in a space corresponding to "YOUR WAY OF USE". Corresponding to this displayed content, the recommended ways of braking, "SLOWLY AND LONGISHLY" and "QUITE SLOWLY", are displayed, with one of the two ways selected. The vehicle battery diagnosis system selects a recommended way of using the battery in order to increase the service life of the battery (e.g., as for the braking in FIG. 5, the system determines which one of the ways of braking, "SLOWLY AND LONGISHLY" or "QUITE SLOWLY", is more suitable to increase the service life, and selects the determined one).

Similarly, for the item 2 "STANDSTILL START", the "YOUR WAY OF USE" is displayed as being "RELATIVELY SHARP", and as recommended ways of use, "SLOWLY AND LONGISHLY" and "QUITE SLOWLY" are displayed so that one of the two ways can be selected. For the item 3 "CABIN TEMPERATURE SETTING", the "YOUR WAY OF USE" is displayed as being "RELATIVELY HIGH", and as recommended ways of use, "TO SLIGHTLY LOWER" and "TO QUITE LOWER" are displayed so that one of the two ways can be selected. For the item 4 "CHARGING METHOD", the "YOUR WAY OF USE" is displayed as being "FULLY CHARGED DAILY", and as recommended ways of use, "FULLY CHARGED ONCE A WEEK, DAILY SOC 70%" and "FULLY CHARGED ONCE A MONTH, DAILY SOC 70%" are displayed, with one of the two ways selected.

Incidentally, the item 1 "BRAKING" and the item 2 "STANDSTILL START" can be grasped as the acceleration of the vehicle.

For the item 5 "LONG-PERIOD PARKING", the "YOUR WAY OF USE" is displayed as being "PARKED FOR 6 MONTHS OR LONGER IN PAST", and as recommended ways of use, "RELATIVELY REDUCE LONG-PERIOD PARKING" and "QUITE REDUCE LONG-PERIOD PARKING" are displayed, with one of the two ways selected. Incidentally, the "LONG-PERIOD PARKING" can also be grasped as the time of stop of the vehicle over a long period.

The item 6 "OTHER (ADDITIONALLY REGISTERED ITEM)" indicates that an item besides the items 1 to 5 can be provided, and that a region where a management item, if any added, can be added in the future, is secured beforehand.

In this manner, in the designed-for-user screen, not many numerical values are displayed, but expressions that are easy for users to understand are used.

Incidentally, as for the user's way of use, statistical processing has been performed in the vehicle-mounted ECU, and results of the processing are transmitted as diagnostic results, and display is performed on the basis of the results.

Referring back to FIG. 4, if in step S3 it is determined that the plan presentee is a dealer's employee, the process proceeds from step S3 to step S5, in which a designed-for-dealer screen is displayed.

Figure 6:
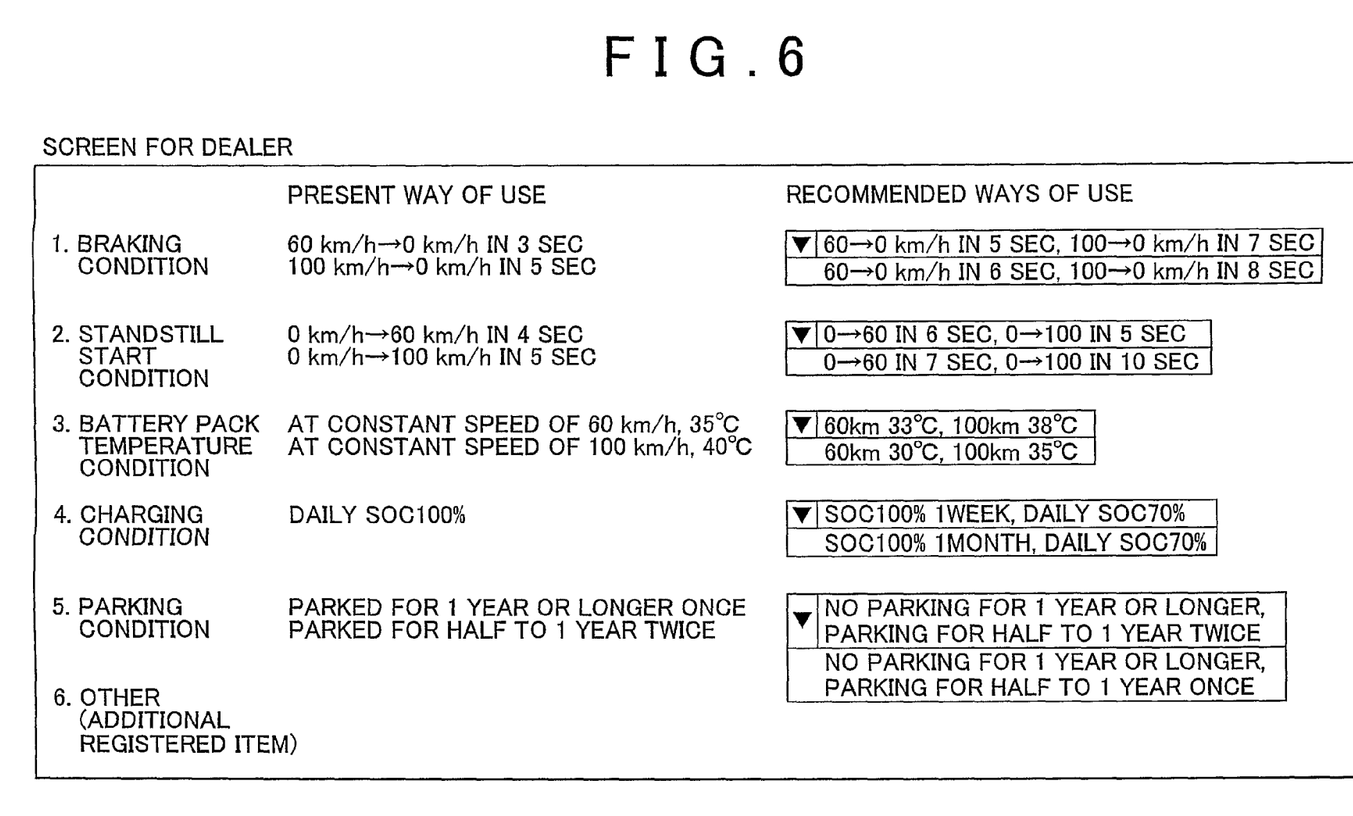
FIG. 6 is a diagram showing an example of the display of a screen designed for a dealer which is displayed in step S5 in FIG. 4.

FIG. 6 is a diagram showing an example of display of a designed-for-dealer screen that is displayed in step S5 in FIG. 4.

Referring to FIG. 6, for the item 1 "BRAKE CONDITION", the present way of use is displayed by numerical values as in "60 km/h→0 km/h IN 3 SEC., 100 km/h→0 km/h IN 5 SEC.", and as recommended ways of use, "60→0 km/h IN 5 SEC., 100→0 km/h IN 7 SEC." and "60→30 km/h IN 6 SEC., 100→0 km IN 9 SEC." are displayed, with one of the two ways selected.

For the item 2 "STANDSTILL START CONDITION", it is indicated that it takes 4 seconds to accelerate from a speed of 0 km/h to 60 km/h, and that it takes 7 seconds to accelerate from 0 km/h to 100 km/h, and as recommended ways of use, "0→60 km/h IN 6 SEC., 0→100 km/h IN 9 SEC.", and "0→60 km/h IN 7 SEC., 0→100 km/h IN 10 SEC." are displayed, with one of the two ways selected.

For the item 3 "BATTERY PACK TEMPERATURE CONDITION", it is indicated that the battery pack temperature is 30° C. in the case of running at a constant speed of 60 km/h, and that the battery pack temperature is 40° C. in the case of running at a constant speed of 100 km/h. Besides, as recommended ways of use, "33° C. AT 60 km/h, 38° C. AT 100 km/h", and "30° C. AT 60 km/h, 35° C. AT 100 km/h" are displayed, with one of the two ways selected.

For the item 4 "CHARGING CONDITION", the present way of use is displayed as "DAILY SOC 100%", and as recommended ways of use, "SOC 100% 1 WEEK, DAILY SOC 70%", and "SOC 100% 1 MONTH, DAILY SOC 70%" are displayed, with one of the two ways selected.

For the item 5 "PARKING CONDITION", the present way of use is displayed as being "PARKING FOR ONE YEAR OR LONGER ONCE, PARKING FOR HALF TO ONE YEAR TWICE", and as recommended ways of use, "NO PARKING FOR ONE YEAR OF LONGER, PARKING FOR HALF TO ONE YEAR TWICE", and "NO PARKING FOR ONE YEAR OR LONGER, PARKING FOR HALF TO ONE YEAR ONCE" are displayed, with one of the two ways selected.

The braking condition and the standstill start condition are associated with the upper-limit value (Wout) of the electric power that is output from the battery, and the upper-limit value (Win) of the electric power charged into the battery. The battery pack temperature condition shows how the temperature of the battery pack is affected by the temperature setting of an air-conditioner 30 in the cabin. The charging condition shows that how frequently the battery is fully charged by the charging from the motor-generator MG1 during an ordinary run of the vehicle, the plug-in charging while the user is at home, etc. The parking condition indicates that how frequently a long-period parking (period during which the vehicle is not started) has occurred. Any one of the foregoing items or the like are diagnostic results that are related to the user's method of using the battery.

Incidentally, the item 6 "OTHER (ADDITIONALLY REGISTERED ITEM)" indicates that an item besides the items 1 to 5 can be provided, and that a region where a management item, if any added, can be added in the future, is secured beforehand.

Referring back to FIG. 4, if in step S it is determined that the plan presentee is a manufacturer's employee, the process proceeds from step S3 to step S6, in which a designed-for-manufacturer screen is displayed.

Figure 7:
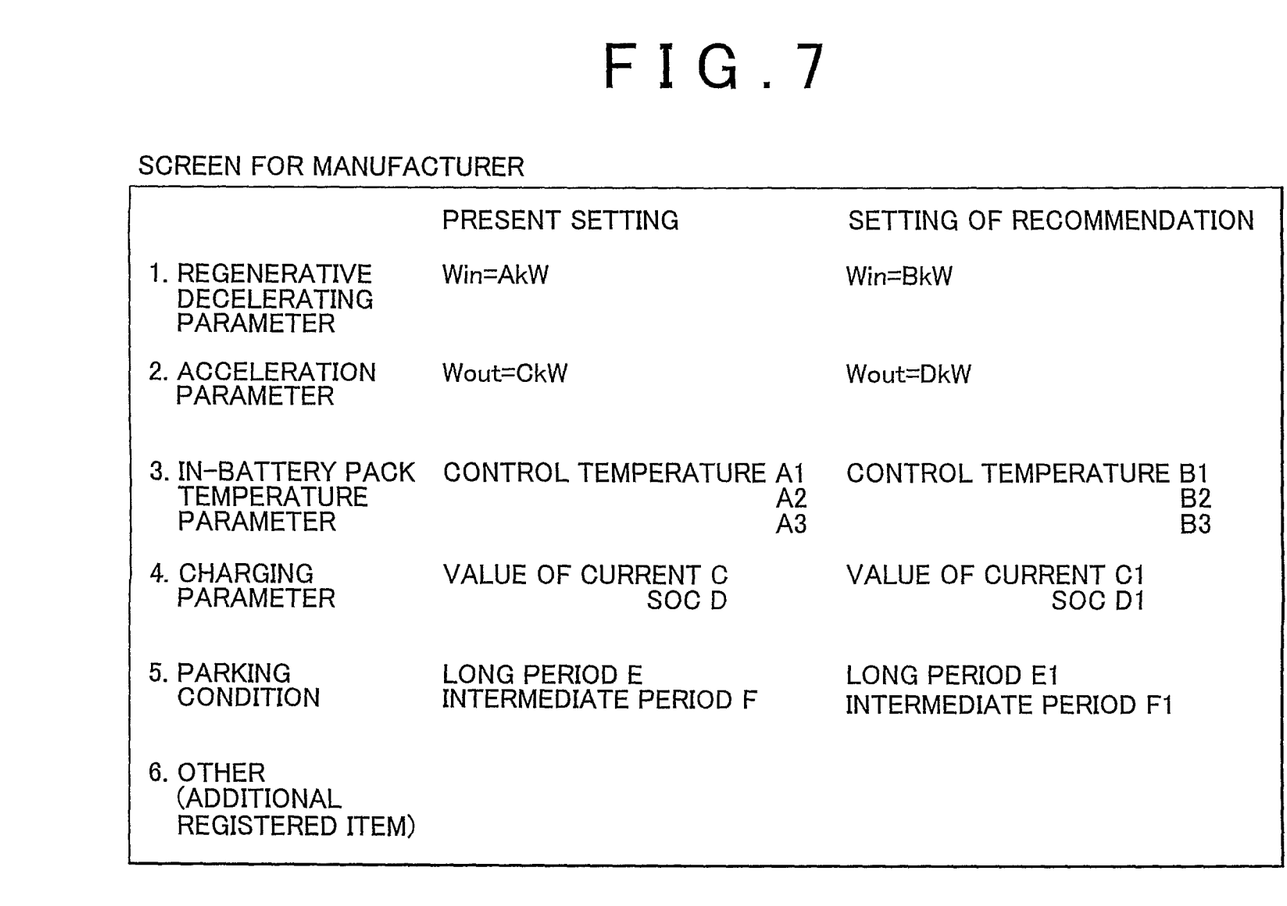
FIG. 7 is a diagram showing an example of the display of a screen designed for a manufacturer which is displayed in step S6 in FIG. 4.

FIG. 7 shows an example of display of a designed-for-manufacturer screen that is displayed in step S6 in FIG. 4. While FIGS. 5 and 6 show the user-intended screen and the designed-for-dealer screen, respectively, FIG. 7 shows an example of display of a designed-for-manufacturer screen. The "RECOMMENDED WAYS OF USE" in the user-intended screen in FIG. 5 and the designed-for-dealer screen in FIG. 6 are provided for advising the user of a recommended way of use. On the other hand, the "RECOMMENDED WAYS OF USE" in the designed-for-manufacturer screen in FIG. 7 is provided for displaying recommended post-change values of control parameters with reference to a service life increase database.

In the designed-for-manufacturer screen in FIG. 7, in the items of a regeneration/deceleration parameter, an acceleration parameter, an in-battery pack temperature parameter, a charging parameter, and a parking condition, the present settings and recommended settings are displayed in numerical value.

Incidentally, the item 6 "OTHER (ADDITIONALLY REGISTERED ITEM)" indicates that an item besides the items 1 to 5 can be provided, and that a region where a management item, if any added, can be added in the future, is secured beforehand.

Referring back to FIG. 4, if in any one of steps S4, S5 and S6, a plan is selected in a corresponding one of the screens intended for the user, the dealer and the manufacturer, the process proceeds from step S7 to step S8. In step S8, merits and demerits of the changing of a control parameter and the changing of vehicle management are displayed. Then in step S9, it is checked whether or not the change will be actually performed.

If in step S9 a command of changing the parameter is given, the process proceeds to step S10, in which a control parameter of the vehicle is changed. This modification is executed by the information changing portion 112 shown in FIG. 2. After that, the process proceeds to step S11, in which the process ends.

On the other hand, if in step S7 no plan has been selected (e.g., if a menu of the "RETURN" menu has been selected, or if in step S9 a command not to change is given, the process in the flowchart ends in step S11.

Figure 8:
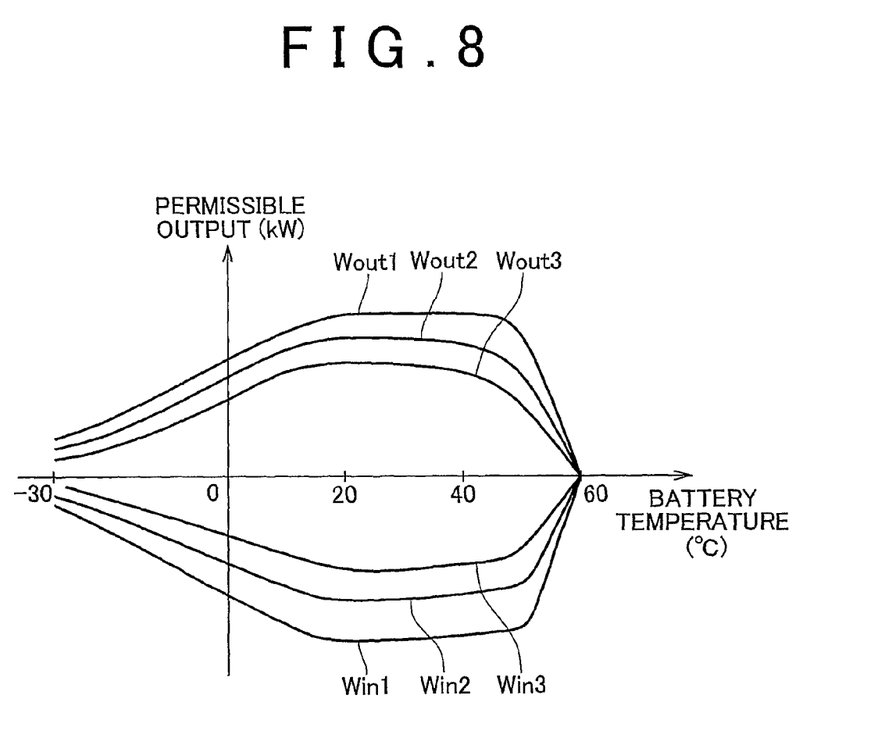
FIG. 8 is a diagram showing a map for changing the control value of a permissible output that can be input to or output from the battery, as an example of the change of a control parameter.

FIG. 8 is a diagram showing maps for changing the restriction value of the permissible outputs that can be input to and output from the battery, as an example of the changing of control parameters.

As shown in FIG. 8, the upper-limit value of the permissible output that can be output from the battery in the case where the battery is new (when a new car is delivered) is shown by a map Wout1. Similarly, the chargeable upper-limit value is shown by a map Win1. It is to be noted herein that the upper-limit value shows how far apart (magnitude) the upper-limit value is from zero, and actually, the value at the side of charging is a negative value.

On the other hand, in the case where the service life shortens if a similar upper-limit value is applied, the restriction value on the output side of the battery is changed from the map Wout1 to a map Wout2 or Wout3. On the charging side (regenerative and deceleration parameters), the upper-limit value is changed from the map Win1 to the map Win2 or Win3.

By changing the output restriction map to a stricter side in order to increase the service life in the foregoing manner, a selection of increasing the service life of the battery by, for example, 1.1 to 1.2 times can be made.

Finally, the vehicle battery diagnosis system of this embodiment will be summarized with reference to the drawings. As shown in FIGS. 2 and 3, the vehicle battery diagnosis system of this embodiment is a vehicle battery diagnosis system that diagnoses the state of use of the rechargeable battery 11 of the vehicle 10 equipped with the battery 11 as a motive power source, the system including: the information accumulation portion 104 that accumulates diagnostic information that includes a use condition regarding the battery 11; the control plan presentation portion 114 that presents a plurality of control plans about the vehicle for increasing the service life of the battery 11 on the basis of the diagnostic information; and the information changing portion 112 that changes control information regarding the control of the vehicle which is retained in the vehicle-mounted ECU 12 of the vehicle 10 so that the control information corresponds to a control plan selected by a user from the plurality of control plans.

Preferably, the vehicle 10 includes the motor-generator MG2 that drives a tire wheel as shown in FIG. 3. The motor-generator MG2 generates regenerative electric power when braking the vehicle 10. The control information includes a control parameter (Win) that is changeable, and that defines an upper limit of the electric power that is acceptable by the battery 11.

Preferably, the control information includes a control parameter (Wout) that is changeable, and that defines an upper limit of the electric power that is outputable from the battery 11.

Preferably, the vehicle 10 includes the air-conditioner 30 that is a temperature adjustment device that uses electric power from the battery 11, and that adjusts the temperature of a housing space (under a seat in the cabin, or the like) for the battery 11. The control information includes a control parameter that is changeable, and that defines a target value for the temperature adjustment device.

Preferably, the vehicle 10 includes: the engine 24; the motor-generator MG1 that is an electric generator that generates electric power when receiving motive power from the engine 24; and the vehicle-mounted ECU 12 that controls of charging the battery 11 with the electric power generated by the generator. The control information includes a control parameter that is changeable, and that defines a target value of the state of charge (SOC) of the battery (an upper-limit SOC in fully charged state, an SOC as an ordinary target, etc.).

Preferably, the vehicle 10 is connectable to the vehicle battery diagnosis system, and includes a memory 13 that is an information storage portion capable of changing the control information regarding the control of the vehicle 10. This memory 13 is mounted in the vehicle-mounted ECU 12.

As described above, according to the battery diagnosis system of this embodiment, service life-increasing plans can be displayed so as to be easily understood by a vehicle user, and more detailed information can be displayed for a dealer's employee and a manufacturer's engineer. Therefore, the vehicle user can consult with the dealer's employee or the like, and can more readily receive advice or the like from the dealer's employee. Hence, it is possible to change a control parameter of the vehicle after the user understands and consents.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vehicle battery diagnosis system that diagnoses state of use of a rechargeable battery of a vehicle equipped with the battery as a motive power source, comprising:
   a non-volatile memory that accumulates a diagnostic result regarding the battery;
   a control plan presentation portion that determines a kind of a plan presentee, reads the diagnostic result, and presents a plurality of control plans about the vehicle for increasing service life of the battery based on the kind of the plan presentee and the diagnostic result; and
   an information changing portion that changes control information regarding a control of the vehicle which is retained in the vehicle so that the control information corresponds to a control plan selected, by the operator, from the plurality of control plans.

2. The vehicle battery diagnosis system according to claim 1, wherein:
   the vehicle includes a rotary electric machine that drives a wheel;
   the rotary electric machine generates regenerative electric power when braking the vehicle; and
   the control information includes a control parameter that is changeable, and that defines an upper limit of electric power that is acceptable by the battery.

3. The vehicle battery diagnosis system according to claim 1, wherein:
   the vehicle includes a rotary electric machine that drives a wheel; and
   the control information includes a control parameter that is changeable, and that defines an upper limit of electric power that is outputable from the battery.

4. The vehicle battery diagnosis system according to claim 1, wherein:
   the vehicle includes a temperature adjustment device that uses electric power from the battery, and that adjusts temperature of a housing space of the battery; and
   the control information includes a control parameter that is changeable, and that defines a target value for the temperature adjustment device.

5. The vehicle battery diagnosis system according to claim 1, wherein:
   the vehicle includes an internal combustion engine, a generator that generates electric power when receiving motive power from the internal combustion engine, and a control portion that performs a control of charging the battery with electric power generated by the generator; and the control information includes a control parameter that is changeable, and that defines a target value of state of charge of the battery.

6. A vehicle that is connected to the vehicle battery diagnosis system according to claim 1, the vehicle comprising:

an information storage portion that is able to change control information regarding a control of a vehicle.

* * * * *